INVENTORS
William G. Blenman, &
BY William A. Brady, Jr.

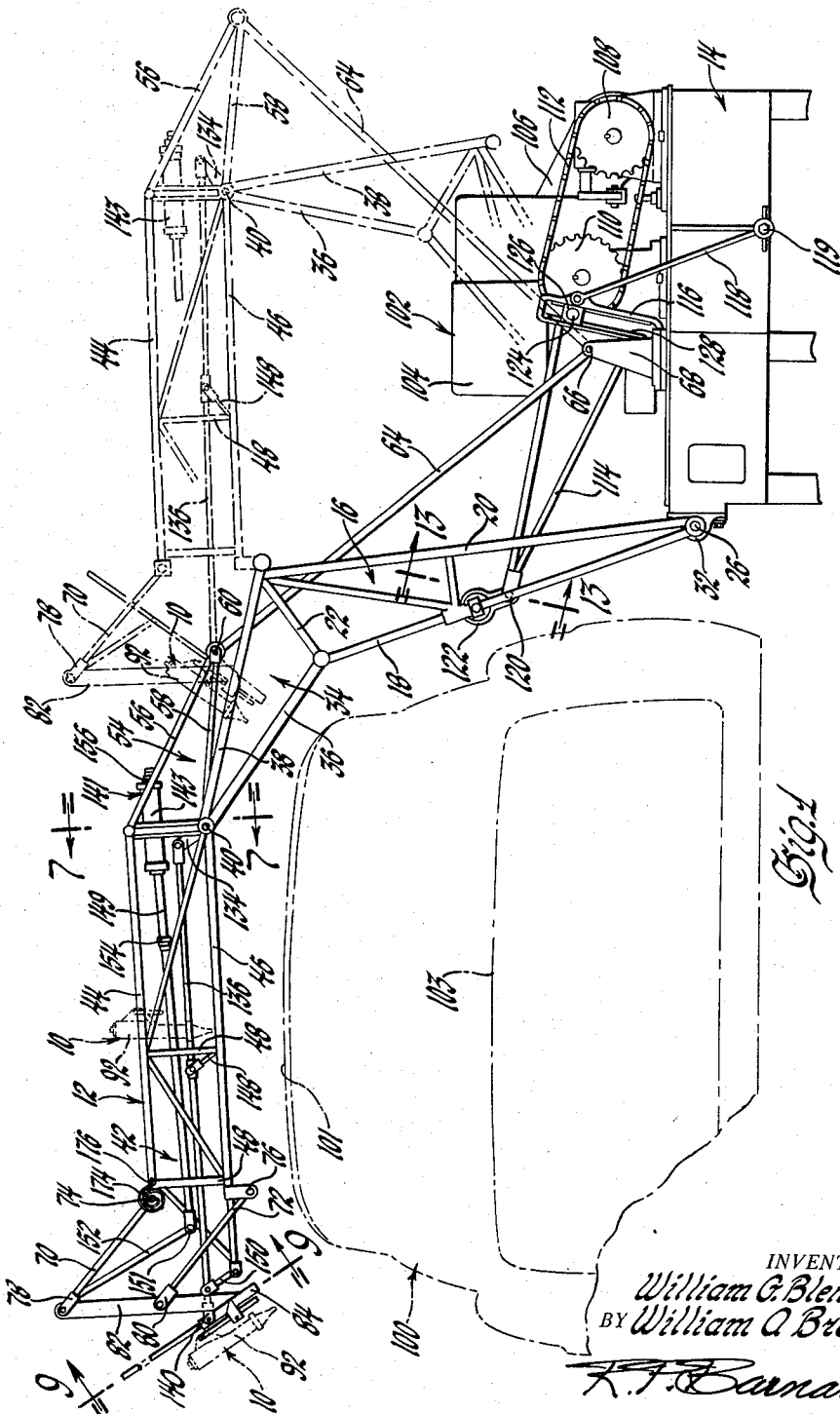

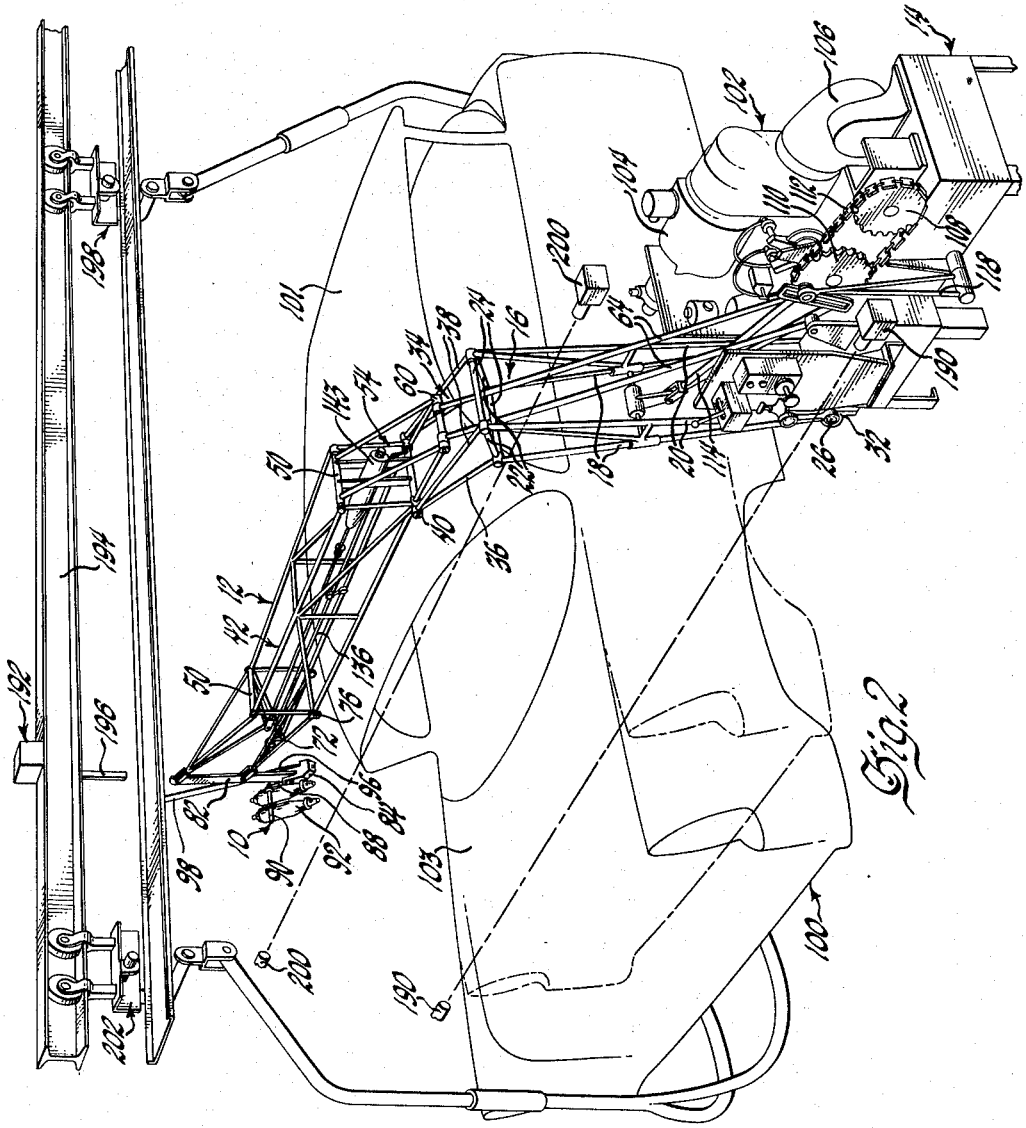

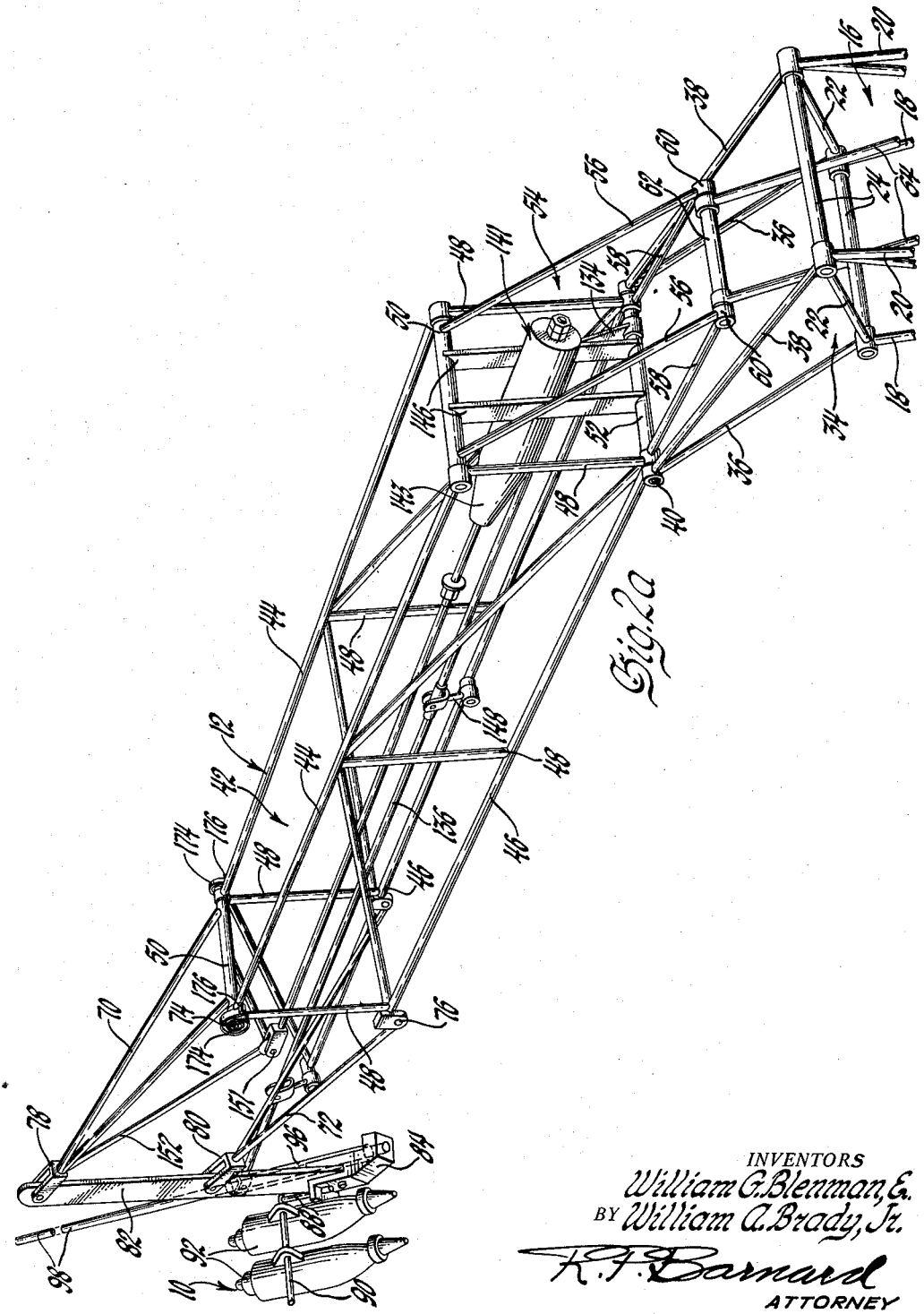

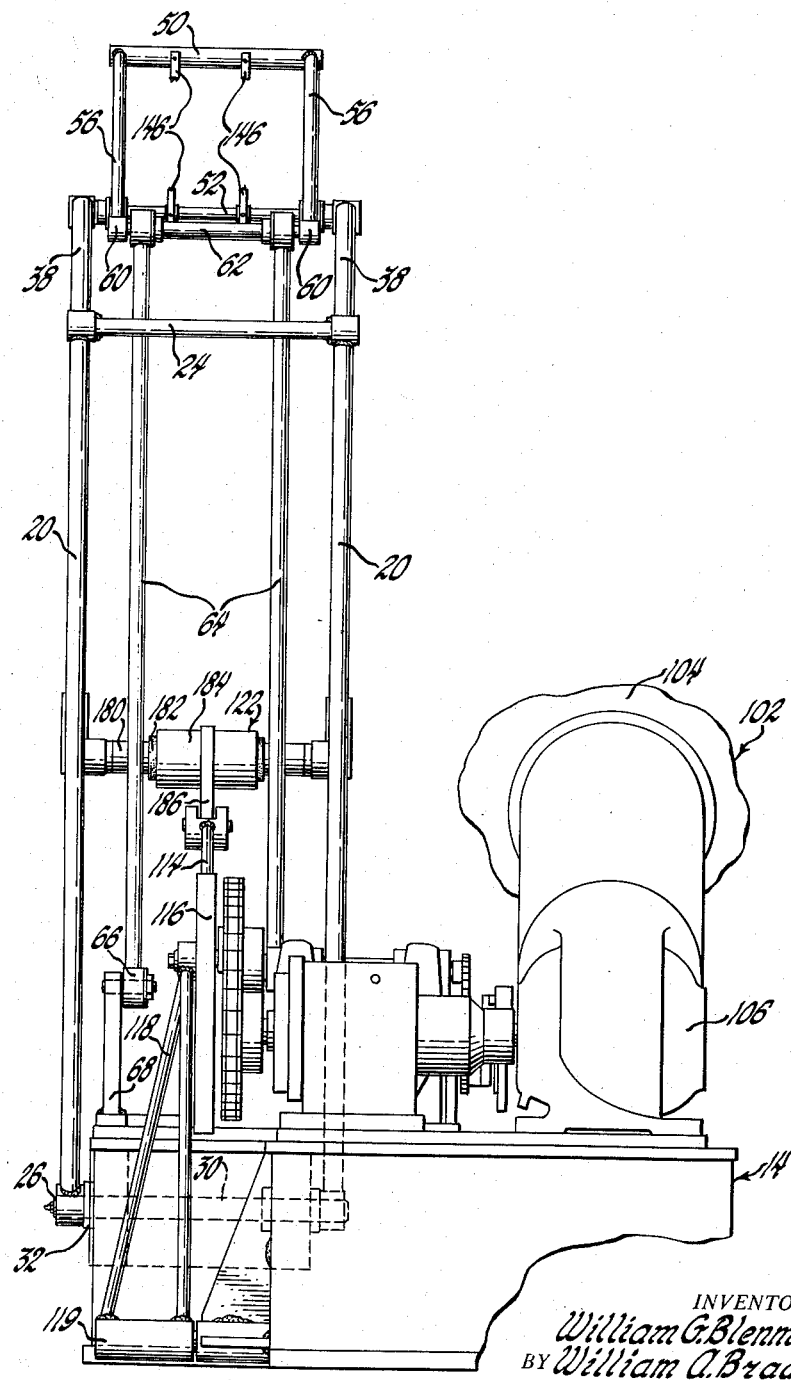

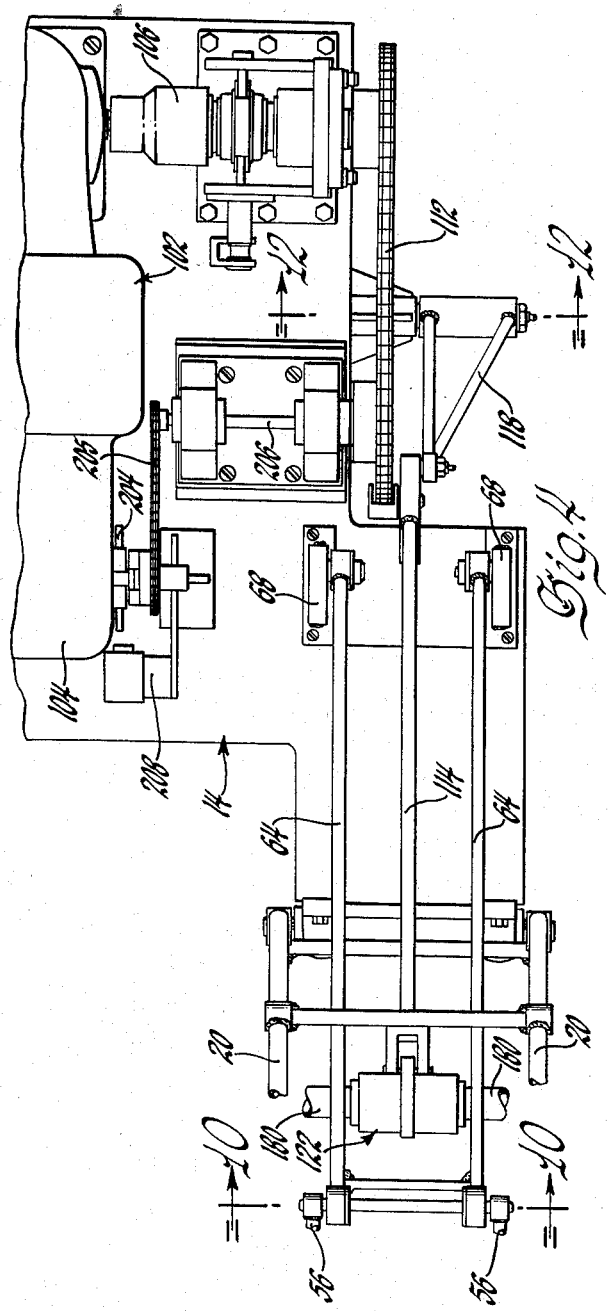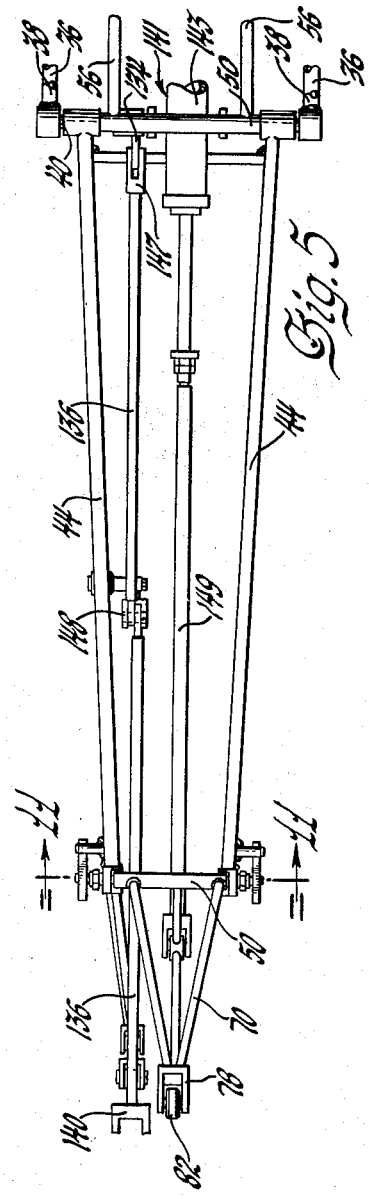

R. F. Bernard
ATTORNEY

Oct. 11, 1960 W. G. BLENMAN ET AL 2,955,568
PAINT SPRAYING APPARATUS
Filed Sept. 24, 1957 9 Sheets-Sheet 8

INVENTORS
William G. Blenman, E.
BY William A. Brady, Jr.
R. F. Barnard
ATTORNEY

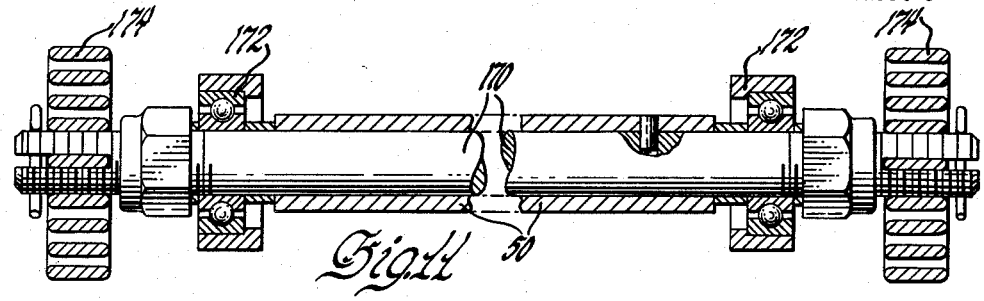
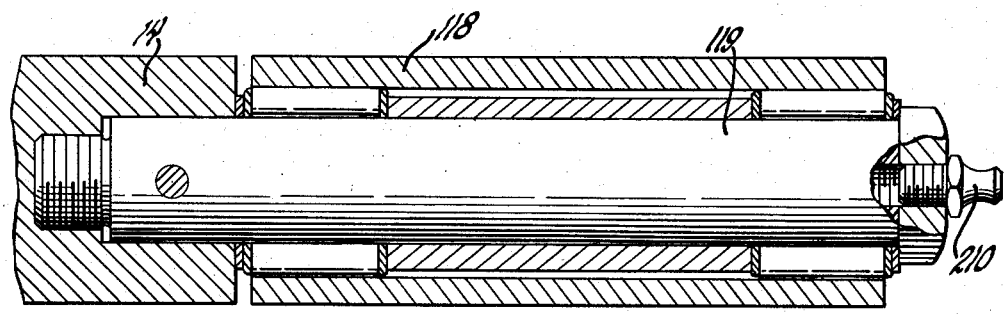
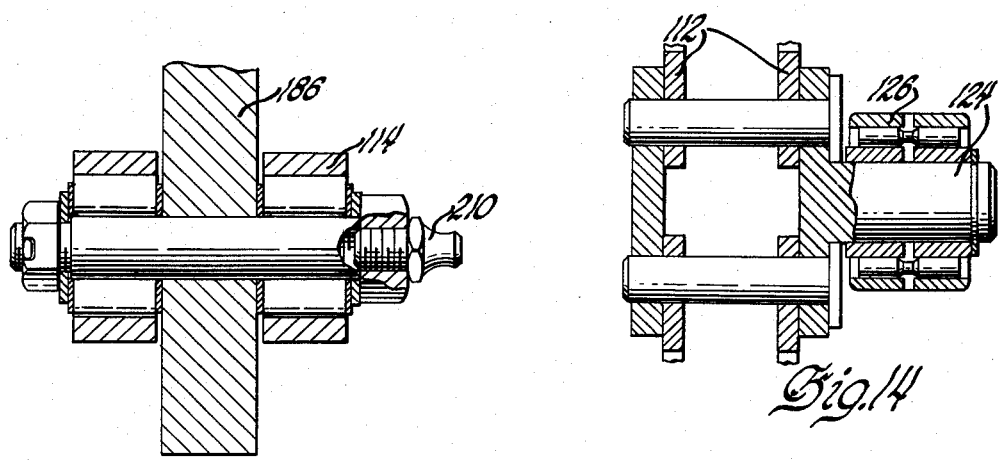

United States Patent Office 2,955,568
Patented Oct. 11, 1960

2,955,568

PAINT SPRAYING APPARATUS

William G. Blenman, Detroit, and William A. Brady, Jr., Warren, Mich., assignors to General Motors Corporation, Detroit, Mich., a corporation of Delaware Filed Sept. 24, 1957, Ser. No. 685,855

10 Claims. (Cl. 118—323)

The present invention relates to a paint spraying apparatus particularly adapted for painting automotive vehicle bodies as they move down an assembly line. While designed for automobile body painting, the present invention is also adapted for use in painting any objects having relatively large surfaces to be painted and particularly where such objects are to be painted when moving along an assembly line.

It is an object of the present invention to provide a spray gun apparatus mounted on a cantilever supported boom mechanism. Further, such boom mechanism is adapted to include means for maintaining the spray gun in a position normal to and at a substantially constant distance from the subadjacent surface to be painted notwithstanding changes in the contour of such surface. Additionally it is proposed to provide a boom mechanism for shifting a spray gun relative to the boom in order to paint a surface offset from that last painted.

In the past it has been necessary in non-manual methods to use separate apparatuses for painting a vehicle body roof and a rear deck lid. This has been the case since most of such apparatuses have consisted of paint spraying heads mounted on fixed tracks and which heads are reciprocated transversely of the vehicle body as the latter moves along the assembly line. A track supporting a spray gun for painting a vehicle body roof leaves the gun too remote from the rear deck lid to paint the same, making it necessary to provide either a separate spraying apparatus for the deck lid or to paint the latter manually. It is apparent that the use of separate mechanisms for painting the roof and rear deck lid surfaces or manually painting one or the other of said surfaces adds appreciably to the cost of painting a vehicle body.

It is, therefore, also an object of the present invention to provide a unique paint spraying apparatus which is capable of painting a plurality of surfaces on an object and which surfaces are relatively offset planes with respect to one another as is the case with a vehicle body roof and rear deck lid.

Considering the subject invention more specifically, a spray gun means is mounted at the free end of a cantilever type boom, the latter which includes a first trapezoidal linkage mechanism adapted to reciprocate the boom transversely of the object to be painted. The object to be painted is in turn moved in the direction normal to the reciprocatory motion of the boom. The legs of the trapezoidal linkage mechanism are proportioned such that the spray gun mechanism remains at a constant distance from the surface to be painted notwithstanding changes in surface contour. The boom mechanism also includes a pair of parallelogram linkage type mechanisms connected to the spray gun device and the first of which parallelogram mechanism maintains the spray gun in a normal attitude with respect to the surface to be painted. The second parallelogram linkage mechanism is adapted to translate or shift the entire spray gun device in a vertical plane relative to the remainder of the boom mechanism in order that surfaces offset one from the other may be painted with the same mechanism.

It is a still further object of the present invention to provide the requisite control devices for automatically actuating the boom mechanism including means for automatically shifting the spray gun means relative to the boom mechanism in order to paint a surface offset from the surface last painted.

Other objects and advantages will be apparent from a perusal of the detailed description which follows.

In the drawings:

Figure 1 is a side elevational view of the subject paint spraying apparatus;

Figure 2 is an isometric view of the paint spraying apparatus in relation to a conveyor line;

Figure 2a is an enlarged view of a portion of Figure 2;

Figure 3 is an end elevational view of a portion of the paint spraying apparatus;

Figures 4 and 5 are plan views of portions of the paint spraying apparatus;

Figure 11 is a view along line 11—11 of Figure 5;

Figure 12 is a view along line 12—12 of Figure 4;

Figure 13 is a view along line 13—13 of Figure 1; and

Figure 14 is a view along line 14—14 of Figure 8.

Figure 6:
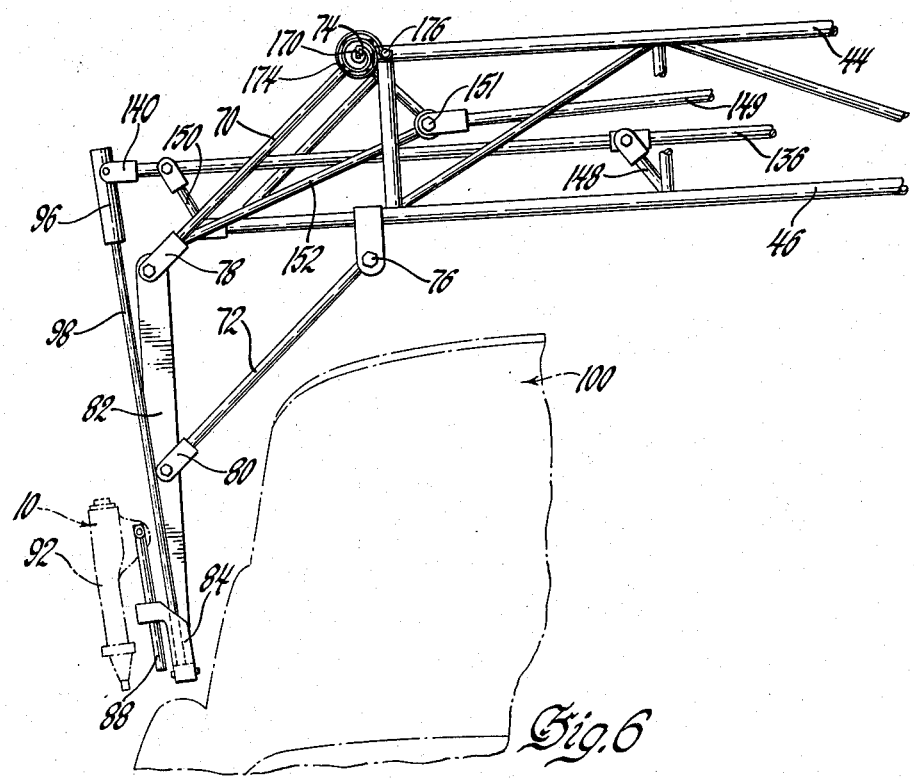
Figure 6 is a view of the paint spraying apparatus in position to paint a deck lid of a vehicle body.

Referring to the drawings, a spray gun device 10 is mounted at the end of a boom mechanism 12 the latter which is pivotally supported upon a base member 14. In order to achieve the various functions desired boom mechanism 12 is comprised of a plurality of interconnected linkage systems and boom sections as will now be described in detail.

Considering the boom structure, per se, a first triangularly shaped box section is indicated generally at 16 and includes corresponding pairs of legs 18, 20, 22 and 24. The converging ends of legs 18 and 20 form pivot points 26 interconnected by a shaft 30 rotatably supported upon brackets or bearings 32 on the base member 14. Another triangularly shaped boom section 34 is fixed to or formed integrally with the upper end of boom section 16 and includes obliquely extending pairs of legs 36 and 38 terminating in pivot points 40.

A rectangular boom section is shown generally at 42 and includes longitudinally extending pairs of legs or struts 44 and 46 interconnected respectively by vertical and horizontal struts 48 and 50. The inner or right end of boom section 42 is pivotally interconnected with the pivot points 40 through a shaft 52 non-rotatably fixed to triangular boom section 34.

A small triangular boom section 54 is fixed to the rectangular boom section 42 proximate the pivot points 40 and extends generally in the direction of and is disposed inwardly of the legs 36 and 38 of the triangular boom section 34. Boom section 54 includes pairs of legs 56 and 58 the former which are fixed at one end to the rectangular boom section strut 50. Legs 56 are pivotally supported upon shaft 62. The converging ends or pivot points 60 of legs 56 and 58 non-rotatably support a shaft 62 therebetween.

A pair of control rods 64 are pivotally mounted at ends 66 to brackets 68 fixed to the base member 14 and generally aligned with brackets 32 but spaced longitudinally rearwardly thereof. The other end of control rods 64 are suitably articulated to pivot points 60 of the triangular boom section 54.

The outer or left end of rectangular boom section 42 has a pair of vertically spaced triangularly shaped frame members 70 and 72 pivotally connected thereto at pivot points 74 and 76. The apices of the triangular frame members 70 and 72 have U-shaped brackets 78 and 80 respectively fixed thereto and which brackets are suitably connected to a supporting bracket 82 for paint spraying mechanism 10. The triangular shape members 70 and 72 are interconnected with the rectangular boom section 42 and the bracket 82 so as to form therewith a parallelogram type linkage.

Figure 9:
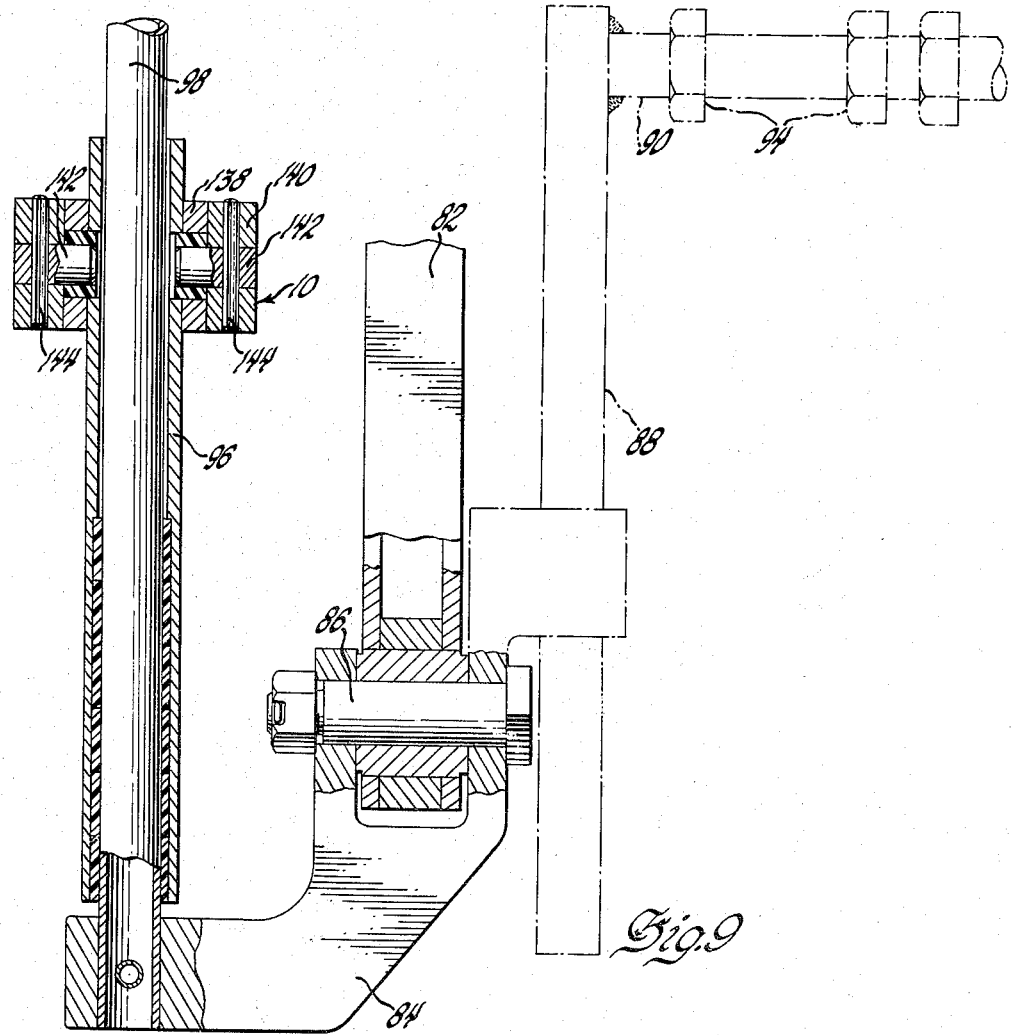
Figure 9 is a view along line 9—9 of Figure 1.
Figure 10:
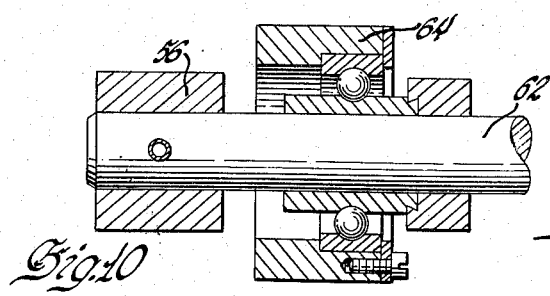
Figure 10 is a partially sectioned view along line 10—10 of Figure 4.

As seen in Figure 9 spray gun mechanism 10 includes a generally L-shaped bracket member 84 pivotally supported through a pin 86 upon the bracket member 82. An L-shaped spray gun supporting arm 88 is adjustably mounted on the bracket 84. Leg 90 of member 88 is adapted to support one or more spray guns 92 which are fixed thereon through nuts 94. It is preferable to provide a pair of spray guns 92 to facilitate painting the roof and deck lid surfaces different colors. The basic position of the spray gun axes relative to arm 88 may be varied by loosening nuts 94.

A tubular sleeve 96 slidably supports a control rod 98 therein. One end of rod 98 is fixed to L-shaped bracket 84. Thus as the supporting bracket 82 is moved up and down in the course of the pivoting of the triangular shaped brackets 70 and 72 about their pivot points 76 and 74, the bracket will cause the control rod 98 to slide longitudinally with respect to its supporting sleeve 96 as will subsequently be considered.

As best seen in Figures 1 and 2, the paint spraying boom mechanism 12 is positioned to cooperate with a vehicle body assembly line, the line-of-movement of which is generally normal or perpendicular to the position of the boom mechanism. In the usual manner the vehicle body 100 to be painted is moved down the assembly line during which movement the paint spraying apparatus 10 and the boom mechanism 12 are adapted to move transversely of the body in order to apply the paint thereto. In order to provide the reciprocatory motion to the boom and spray gun mechanisms, a driving mechanism 102 is operatively connected to the boom mechanism in a manner now to be described. Drive mechanism 102 includes a motor 104 connected through suitable power transmission means 106 to a driving sprocket 108. A corresponding idling sprocket 110 is spaced from the driving sprocket 108 and interconnected therewith through a chain member 112. A triangular shaped bracket 114 includes a slotted yoke 116 at one end thereof and which yoke is eccentrically articulated to a rod 118, the other end of which rod is articulated to a shaft 119 projecting from the base member 14. The apex 120 of triangular bracket 114 is pivotally connected to boom section 16 through a device indicated generally at 122, infra.

A pin 124 is suitably fixed, as seen in Figure 14, to two links of the drive chain 112 and has a slide 126 rotatably mounted thereon which coacts with the slots 128 of the yoke 116. As the chain 112 is driven by the sprocket 108, the triangular frame member 114 will be caused to reciprocate rotating links 18, 20 and 64 about pivot points 26 and 66 and in turn imposing a generally reciprocatory motion on the boom mechanism 12.

As the driving mechanism 102 reciprocates the boom mechanism 12, the pivot points 40 and 60, connecting respectively with rectangular and triangular boom sections 42 and 34, will move in arcuate paths as indicated by the phantom view. If the linkage mechanism described by the pivot points 26, 40, 60 and 66 were a parallel linkage system the end of the boom mechanism supporting the spray guns 92 would describe a true arc. Movement in an arcuate path normally would not correspond with the contour of the surface being painted. Therefore, by suitably proportioning the length of certain of the links comprising the linkage mechanism as defined by the last mentioned pivot points, a trapezoidal linkage system is achieved which will cause the reciprocatory boom motion to maintain the spray guns at a substantially constant distance from the vehicle surface being painted. In this way as the boom reciprocates the spray guns closely follow the contour of the subadjacent body surface. It is apparent that as the body contours change from model to model or from model year to model year it is only necessary to substitute links of the appropriate length whereby the paint spray guns 92 will follow the appropriate body contour. While not so shown, it is within the scope of this invention to make the appropriate links, such as, 18, 20 and 64 of adjustable length to further simplify varying the path of travel of the spray guns 92 in traversing body 100.

Figure 7:
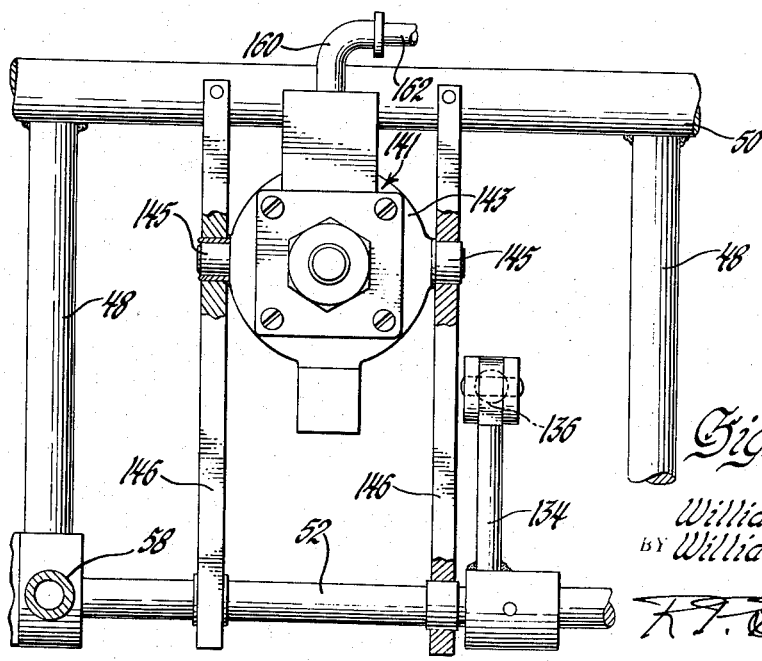
Figure 7 is a view along line 7—7 of Figure 1.
Figure 8:
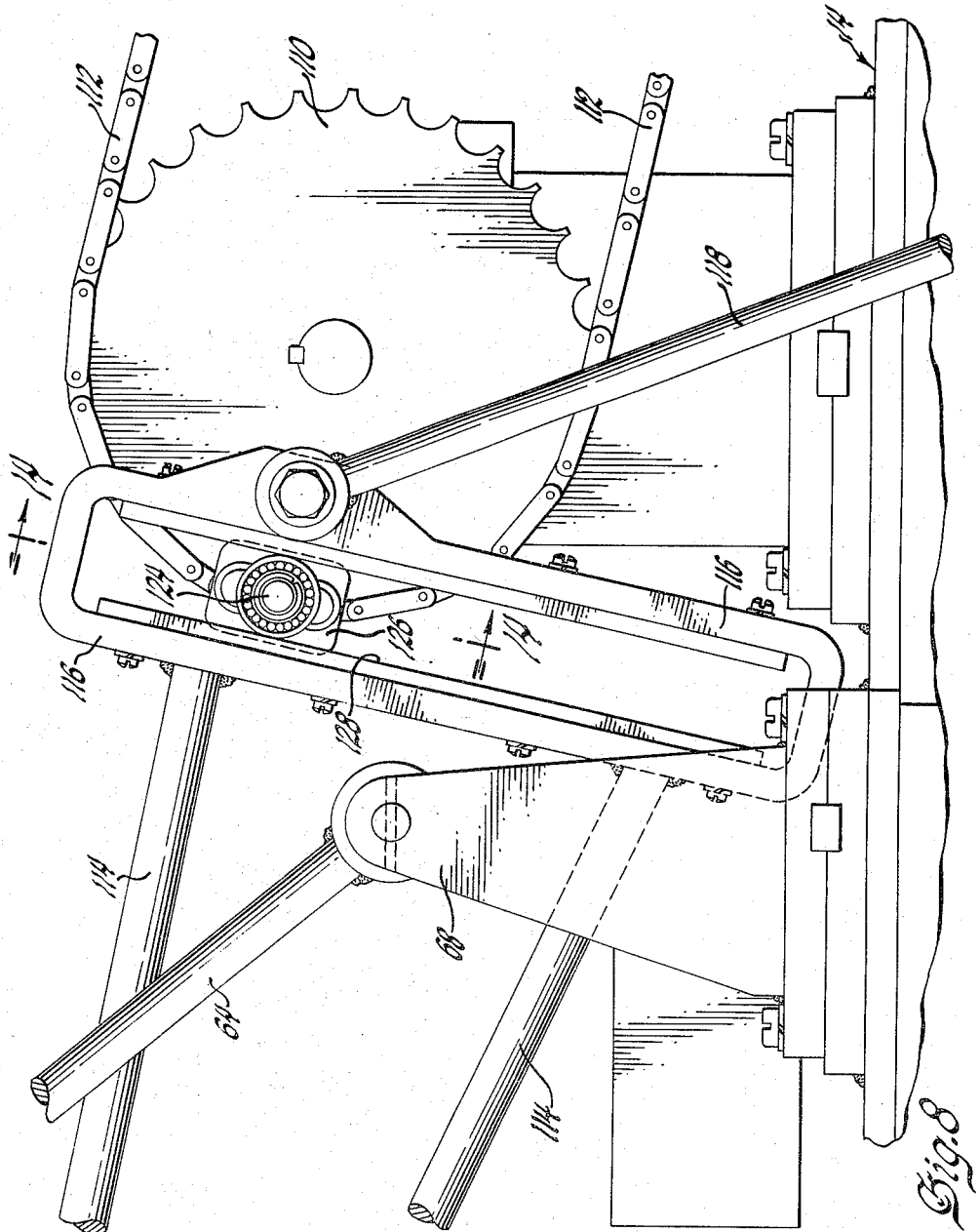
Figure 8 is an enlarged view of a portion of the boom reciprocating mechanism.

As already noted, the L-shaped bracket 84 supporting the spray guns 92 is adapted to be pivoted relative to the supporting bracket 82. The purpose of this pivoting relationship is to provide a mechanism whereby the spray gun axes may be maintained in a substantially perpendicular relationship to the subadjacent surface being painted, since it is established that applying paint normally or perpendicularly to a surface provides the most satisfactory coating. The pivot points 40 representing the connection between the rectangular boom section 42 and the triangular section 34 includes shaft 52 which is fixed in non-rotative relation to the latter section. As seen in Figures 1, 2a and 7, a lever 134 is fixed to shaft 52 and extends angularly in the direction of the rectangular boom section 42. A rod 136 is articulated between lever 134 and the paint spray mechanism supporting sleeve 96. Rod 136 may either be of one piece construction or comprise a plurality of articulated sections as indicated in Figure 5.

A collar 138 is formed on sleeve 96 and to which collar a U-shaped bracket 140 on the end of the rod 136 is connected through pins 142. Pins 142 are locked in position by pins 144. A similar bracket 147 is formed on the other end of rod 136 for connection with the lever 134. In order to properly support the rod 136 in relation to the boom mechanism additional levers 148 and 150 are pivotally connected intermediate the rod and the rectangular boom section strut 46. Thus, the rod 136, and levers 134, 148 and 150 together with strut 46 form a parallelogram linkage system.

As already noted, the various linkage mechanisms of the boom mechanism 12 are so arranged and that the paint spray guns 92 will remain at a substantially constant distance from the surface of the object to be painted, or, as illustrated, will follow the contour of the roof and rear deck lid surfaces 101 and 103 of vehicle body 100.

Since shaft 52 and lever 134 are fixed to boom section 34, as this section is rotated from the extended or leftmost position to the rightmost position, shown in dash lines in Figure 1, lever 134 will be rotated in a clockwise direction relative to boom section 42. Such movement of lever 134 will, through rod 136, impart a similar movement to sleeve 96, rod 98 and bracket 84 to maintain the spray gun axes normal to the surfaces of body 100 to be painted. Thus it is clear that the spray gun axes are angularly varied in accordance with the reciprocatory movement of the boom mechanism 12.

As thus far described, a cantilever boom mechanism is provided in which the spray guns 92 are moved in a path which follows the contour of the object to be painted and further which guns are maintained at all times substantially perpendicular to the surface being painted. As noted, however, it is an object of the present invention to provide a paint spraying apparatus in which it is possible to paint a plurality of surfaces on such object and which surfaces are offset from each other, as is the case with automotive vehicle body roof and deck lid surfaces.

The subject paint spraying apparatus achieves offset surface painting through the parallel linkage mechanism defined by the triangularly shaped frame members 70 and 72 which, as noted, are articulated between the paint spray mechanism supporting bracket 82 and points 74 and 76 on the rectangular boom section 42. As seen in Figures 1 and 2, the parallelogram linkage system 70, 72 and 82 is in an upper position permitting the paint spray guns 92 to paint the roof surface 101 of the vehicle body 100.

When it is desired to paint the rear deck lid surface 103, upon the completion of painting the roof, it is necessary to lower the paint spray gun supporting bracket 82 to a position proximate the rear deck lid. This is achieved by rotating the parallelogram linkage mechanism 70, 72 and 82 in a counterclockwise direction relative to the rectangular boom section 42. To control the vertical displacement of the spray gun mechanism 10 relative to the rectangular boom section 42, a power mechanism indicated generally at 141 is provided for rotating the last mentioned parallelogram linkage mechanism in accordance with conditions to be subsequently considered.

Power mechanism 141 includes a fluid motor 143 having trunnions 145 pivotally supported between a pair of vertically extending brackets 146 secured between cross link 50 and shaft 52. The piston or movable member, not shown, of the fluid motor 143 is connected to a control rod 149 articulated at its other end to point 151 of the depending portion 152 of frame 70. Adjustable stops 154 and 156 are disposed on the control rod 149 and are adapted to abut against the fluid servomotor casing to respectively limit the downward and upward travel of the paint spray mechanism 10. A suitable fluid supply connection 160 is provided on the servomotor 143 and is interconnected with a conduit 162 leading from a source of fluid pressure, not shown. By supplying compressed air to servomotor 143 rod 149 may be moved to the right, as viewed in Figure 1, lowering the paint spray mechanism 10. The operation of servo 143 will be subsequently described.

As best seen in Figures 1, 6 and 11, the upper triangular frame 70 is fixed to a shaft 170 pivotally supported at the left end of the rectangular boom section 42 through bearings 172. Coil springs 174 are disposed at either end of the shaft 170 and fixed thereto. The other ends of springs 174 are connected to studs 176 formed on or fixed to boom strut member 44 in such a way as to impart an upward bias to balance the weight of the parallelogram linkage mechanism 70, 72 and 82. While springs 174 may be made strong enough to bias mechanism 70, 72 and 82 in its upper position permitting the utilization of a single acting servo to lower the mechanism, in the present device servomotor 143 is a double acting type providing the means for both lowering and raising the paint gun-supporting mechanism.

As previously noted, the boom reciprocating mechanism including the triangular frame member 114 is fixed to triangular boom section 16 through a mechanism 122. Mechanism 122 provides a resilient connection between the boom reciprocating mechanism and the boom 12 whereby the paint spraying mechanism is cushioned against jerky movement when the stroke of the reciprocating mechanism 102 is reversed, supra. More specifically mechanism 122 includes a shaft 180 mounted transversely of boom links 18 and bonded to which shaft is a cylindrical rubber sleeve 182. A metallic sleeve 184 is in turn bonded to the rubber sleeve 182 with said metallic sleeve having a lever 186 suitably affixed thereto. The apex 120 of the triangular frame 114 is pivotally connected to the lever 186. Thus as the frame 114 is caused to reciprocate back and forth by chain 112, the motion transmitted to the frame is cushioned by the resilient sleeve 182 so as to make the change of direction of the boom mechanism transversely of the assembly line relatively shock free whereby a smooth application of paint is achieved.

The means will now be considered for automatically controlling the paint spray boom mechanism 12 in relation to the surfaces 101 and 103 of the vehicle body 100 and further in relation to the conveyor line mechanism supporting such body. The initiation of the various steps of the operation of the paint spraying apparatus are controlled by photocells and switches which have been diagrammatically portrayed in Figure 2. No effort has been made to show the electrical circuits in detail since they form no part, per se, of the present invention and their construction would be obvious from the function of the various electrical initiating devices which will be hereinafter set forth. A first photocell 190 is suitably mounted on the boom supporting bed 14 and is adapted to be blocked by the vehicle body 100 as it moves toward the paint spraying apparatus and to thereby establish an initiation circuit. A switch 192 is mounted on the assembly line monorail 194 and includes an arm 196 operated by the front body carrier 198 to complete establishment of the initiation circuit. At this point the boom mechanism 12 will be in its fully retracted or rightward position, as shown in broken lines in Figure 1, in order to permit the body carrier to pass thereby. A second photocel 200 is provided and is blocked by the vehicle roof to activate power transmitting means 106 and hence initiate the paint spraying operation. The electrical circuit controlled by the photocell 200 also initiates the pumping circuit which begins the flow of paint through one of the paint spray guns 92.

It should also be noted that the spray guns 92 do not, per se, constitute a part of the invention and therefore will not be described in detail. In addition and solely for the purpose of simplifying the drawings, the air and paint lines normally connected to the spray guns have been eliminated as have been the air and paint reservoirs and attendant pumping devices all of which would be necessary to actually spray paint.

Upon completion of the roof spraying operation, photocell 200 sees light stopping the spray gun operation and initiating the gun lowering mechanism which includes actuation of the fluid servomotor 143, supra.

When the mechanism 70, 72 and 82 has been lowered to position the spray guns 92 adjacent the rear deck lid surface 103, a suitable switch, not shown, will start the flow of paint again and the painting of the rear deck lid will take place. During the lowering of guns 92, the reciprocating motion of boom 12 need not be interrupted. Upon completion of the deck lid spraying operation, the photocell 190 sees light to stop the operation of the deck lid spray gun and initiate the gun raising mechanism which includes reversing the application air as well as the venting of servo 143 to lift members 70 and 72.

Normally, upon completion of the deck lid spraying operation the boom mechanism will also be fully retracted to the right and out of the path of travel of the conveyor mechanism. If, however, the boom mechanism is not retracted, the switch 192 is opened by the back body carrier 202 which will stop the conveyor line permitting the defective operating mechanism to be repaired without occasioning any damage to the boom mechanism by the conveyor mechanism.

The spray gun mechanism 10 is adapted to overtravel the body surfaces 101 and 103 at the end of each stroke to allow for the non-linear motion encountered during the stroke reversal of the boom reciprocating mechanism and which might otherwise cause an uneven application of paint to the body. During the overtravel of the boom mechanism, the spray guns 92 are shut off. A rotating tripping device is provided for this purpose and includes a rotary actuator 204 driven by a chain 205 leading from the shaft 206 of the sprocket 110. The tripping device also includes a valve mechanism 208 actuated by the rotary actuator and which mechanism actually shuts off the flow of paint during overtravel. Actuator 204 is adapted to make one revolution per cycle causing valve mechanism 208 to shut off the spray of paint at the end thereof. In this case the cycle is the movement of the spray gun from one side of the body to the other and back again. In other words, there is overtravel and paint cut-off in each direction. It is apparent that the on-off cycles of the paint spray guns may be varied by suitably adjusting the contacting relationship between the rotary actuator 204 and the valve mechanism 208.

To reduce frictional resistance in the actuation of the boom mechanism 12 roller or ball bearing devices are provided at the points of pivotal connection between various links or sections of the mechanism as shown in the detail views of Figures 10 through 14. Additionally, those bearing devices subjected to particularly heavy loads or movements are provided with fittings 210 to enable grease to be injected therewithin to reduce bearing wear.

In addition to providing a unique mechanism for enabling a paint spraying device to be maintained at a substantially constant distance from and at a perpendicular altitude with respect to the conveyor-carried surface to be painted the present apparatus is constructed to reciprocate at a velocity which will insure the even application of paint to such surface.

To apply equal quantities of paint in traversing the subadjacent surface, it is mandatory that the velocity of the cantilever boom mechanism be substantially constant when gun 92 is spraying paint. To achieve this constant velocity, that portion of the boom reciprocating mechanism, including boom leg 18, between points 26 and 120, triangular bracket 114 and rod 118 as well as pivot points 26 and 119 are spaced and proportioned to form a parallelogram linkage system. Save for when it is reversing direction at the end of travel, the latter parallelogram linkage system, therefore, will actuate the boom structure at a substantially constant velocity as determined by the driving mechanism 102.

It is also apparent that the speed of reciprocation of the boom mechanism must be suitably coordinated with the speed of movement of the assembly or conveyor line to insure the proper quantitative application of paint. To illustrate, if the speed of assembly line travel should be increased ten percent, drive mechanism 102 would have to be adjusted to assure a similar ten percent increase in the reciprocatory velocity of the boom mechanism. It is to be understood that coordination of assembly line and paint boom velocities may be achieved automatically or manually by an operator.

In view of the rather complicated nature of the subject paint spraying apparatus, it is apparent that various structural modifications may be made within the scope of the invention as set forth in the appended claims.

We claim:

1. A machine for painting a plurality of relatively offset surfaces on an object, said machine comprising a spray gun means, boom means for supporting said spray gun means in proximately spaced relation to one of said surfaces, means for reciprocating said boom means transversely of said surfaces, said boom means including first and second linkage means pivotally connected intermediate said boom means and said spray gun means, and power means connected to said second linkage means for rotating the latter means relative to the boom means to move the spray gun means toward another of said plurality of surfaces, a pivotal connection between the spray gun means and the first linkage means, a parallelogram linkage system supported on said boom means, said system being articulated to the spray gun means, and means for rotating said parallelogram linkage system relative to that portion of the boom means supporting the spray gun means to maintain the spray gun means axis normal to the subadjacent surface to be painted during the reciprocation of the boom means.

2. A machine as defined in claim 1 in which said boom means comprises a first boom section supporting the first linkage means at one end thereof, a base, and a trapezoidal linkage system articulated between said base and said first boom section, said trapezoidal linkage system being proportioned to maintain the spray gun means at a constant distance from the surface being painted during the reciprocation of said boom means.

3. A machine as defined in claim 2 in which said boom reciprocating means is articulated to the trapezoidal linkage system to rotate the same relative to said base.

4. A machine as defined in claim 3 in which said reciprocating means includes a device for resiliently transmitting the motion of said latter means to the trapezoidal linkage system.

5. A machine as defined in claim 1 in which said boom means includes a generally horizontally disposed section to one end of which a third linkage means is articulated, said first linkage means being of the parallelogram construction and articulated to the spray gun means, said second linkage means being of trapezoidal construction and pivotally connected to spaced points on the parallelogram, said trapezoidal linkage being proportioned to maintain the spray gun means at a substantially constant distance from the surface being sprayed, a leg of the parallelogram linkage being fixed to the trapezoidal linkage to maintain said spray gun axis normal to the surface being sprayed.

6. A machine for spraying a plurality of relatively offset surfaces on an object, said machine comprising a spray gun means, boom means for supporting said spray gun means in proximately spaced relation to one of said surfaces, means for reciprocating said boom means transversely of said surfaces, said boom means including first linkage means for maintaining the spray gun means normal to and at a constant distance from the subadjacent object surface during the reciprocation of said boom, a device providing a resilient connection between said reciprocating means and said first linkage means, and means operatively interconnecting said boom means and said spray gun means, said interconnecting means being adapted to move said spray gun means relative to the boom means to a spraying position adjacent another of said plurality of surfaces.

7. A machine for spraying a plurality of relatively offset surfaces on an object, said machine comprising spray gun means, means for supporting said spray gun means in proximately spaced relation to one of said surfaces, a triangular frame member having its apex articulated to the supporting means, a slot formed in the base of the frame member, an element slidably disposed in said slot, a rod eccentrically articulated at one end to the base of the frame member, a base, the other end of said rod being pivotally mounted to said base, driving means connected to said slidable element for imparting a reciprocatory movement to the spray gun supporting means, said supporting means including a linkage device for maintaining the spray gun means normal to and at a constant distance from the subadjacent object surface during the reciprocation of said supporting means, a parallelogram linkage device interconnecting said supporting and spray gun means, spring means for balancing the parallelogram linkage device, and servo means for actuating the parallelogram linkage device whereby the spray gun means may be moved adjacent a plurality of surfaces to be painted.

8. A machine for spraying a plurality of relatively offset surfaces on an object, said machine comprising spray gun means, means for supporting said spray gun means in proximately spaced relation to one of said surfaces, means for reciprocating the supporting means transversely of said surfaces, said supporting means including a linkage device for maintaining the spray gun means normal to and at a constant distance from the sub-adjacent object surface during the reciprocation of said supporting means, and means operatively interconnecting said supporting means and said spray gun means, said interconnecting means being adapted to move said spray gun means relative to the supporting means to a spraying position adjacent another of said plurality of surfaces, said reciprocating means including a triangular frame member having its apex articulated to the supporting means, a slot formed in the base of the frame member, an element slidably disposed in said slot, a rod eccentrically articulated at one end to the base of the frame member, a base for said supporting means, the other end of said rod being pivotally mounted to said supporting means base, and driving means connected to said slidable element for imparting a reciprocatory movement to the spray gun supporting means.

9. A machine as defined in claim 8 in which said frame member supporting means, rod and base are operatively articulated to provide a parallelogram linkage system.

10. A machine as defined in claim 9 in which said linkage device includes a bracket member pivotally connected to said interconnecting means, an arm fixed to said bracket member for supporting the spray gun means, a rod fixed to said bracket member, a tubular sleeve slidably supporting the rod therewithin, and means connected to said sleeve for causing rotation of said bracket around the pivotal connection.

References Cited in the file of this patent

UNITED STATES PATENTS

| | | |
|---|---|---|
| 2,286,571 | Pollard | June 16, 1942 |
| 2,344,108 | Roselund | Mar. 14, 1944 |
| 2,345,834 | Schweitzer | Apr. 4, 1944 |
| 2,598,246 | Fowler | May 27, 1952 |
| 2,840,037 | Verba | June 24, 1958 |